Aug. 21, 1934.　　　　O. BOTHE　　　　1,971,028
ACOUSTIC ADVERTISING DEVICE
Original Filed Sept. 17, 1928　　6 Sheets-Sheet 1

INVENTOR
Otto Bothe
By Dowell & Dowell
his Attorneys.

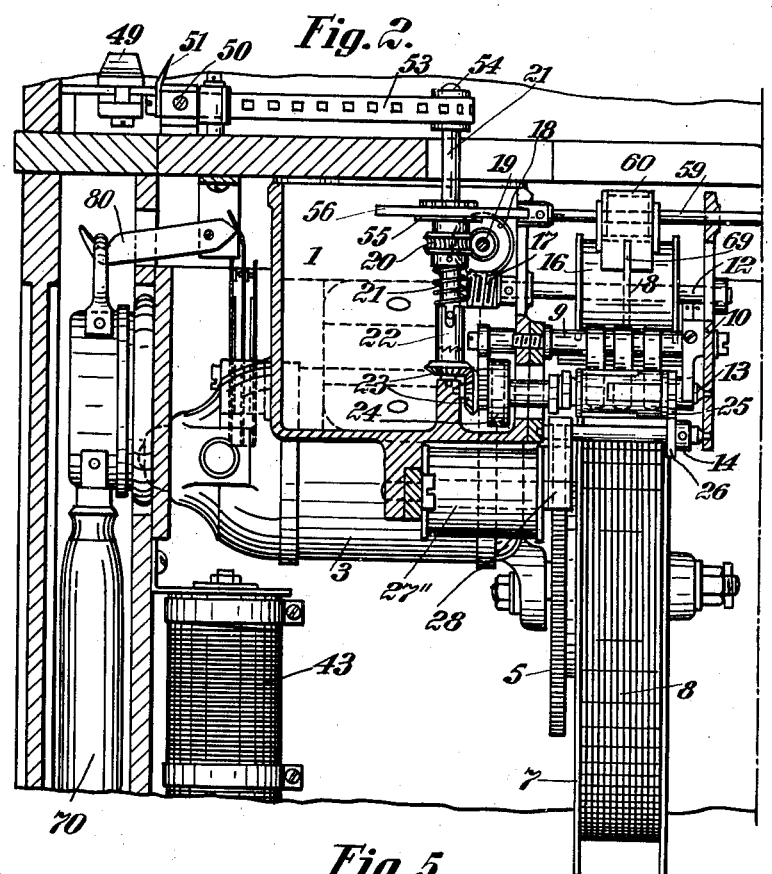
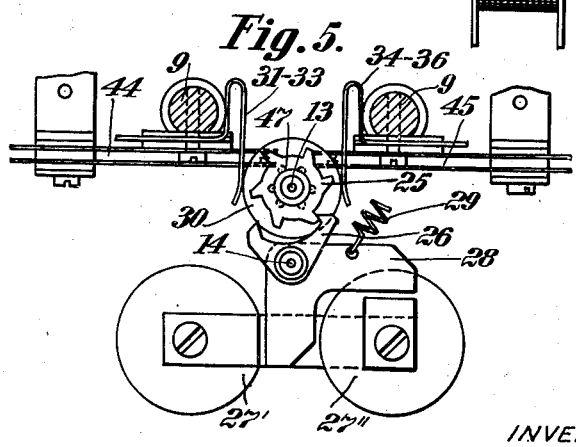

Aug. 21, 1934. O. BOTHE 1,971,028
ACOUSTIC ADVERTISING DEVICE
Original Filed Sept. 17, 1928  6 Sheets-Sheet 3
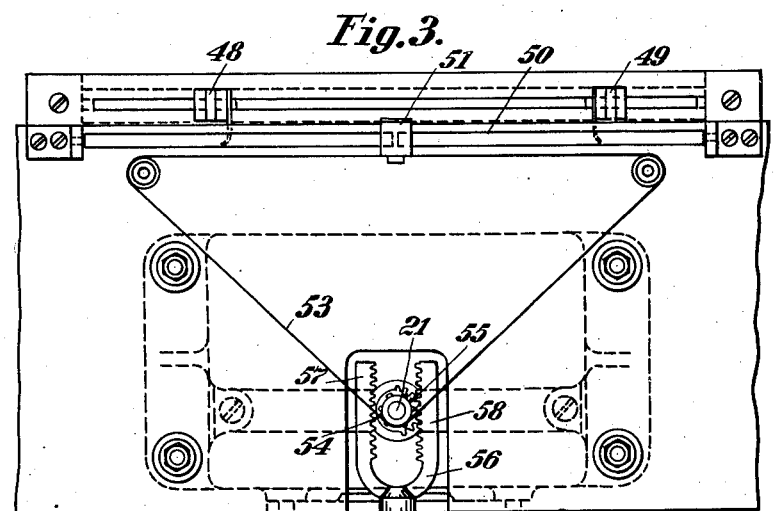
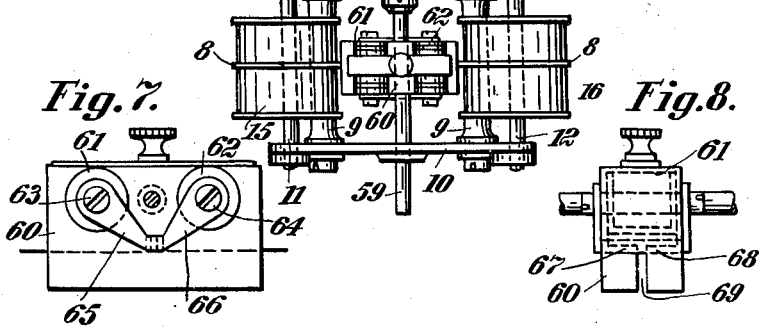
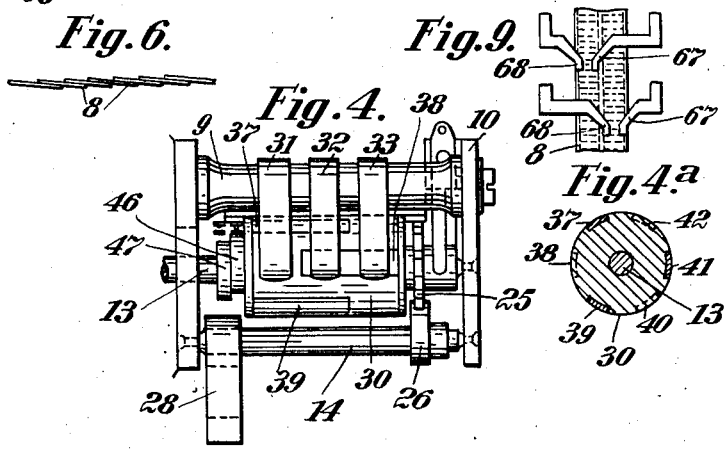
INVENTOR
Otto Bothe
By Dowell & Dowell
his Attorneys.

Aug. 21, 1934.   O. BOTHE   1,971,028
ACOUSTIC ADVERTISING DEVICE
Original Filed Sept. 17, 1928   6 Sheets-Sheet 4

INVENTOR
Otto Bothe
By Dowell & Dowell
his Attorneys.

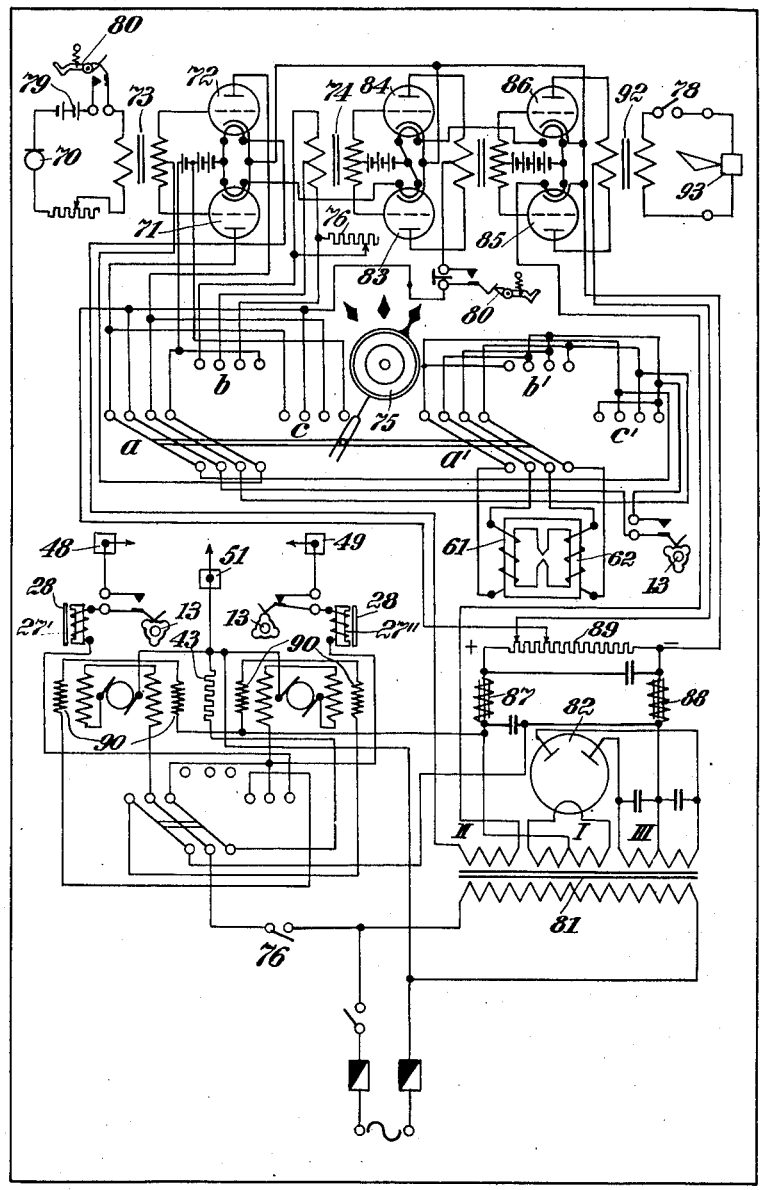

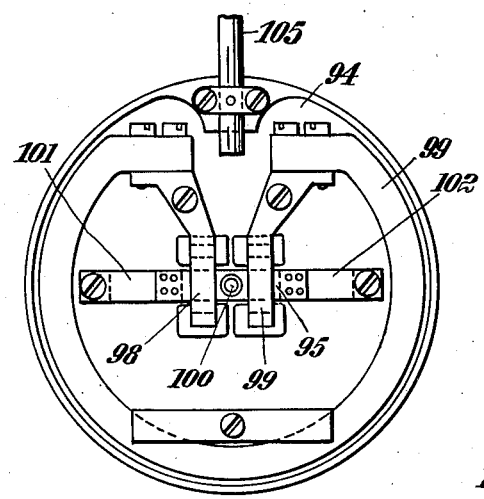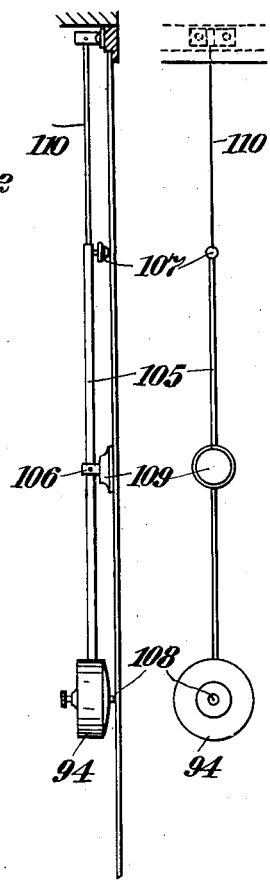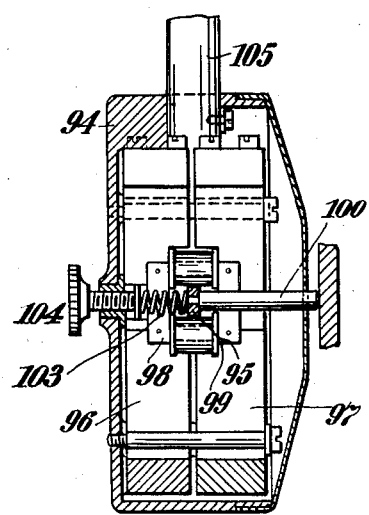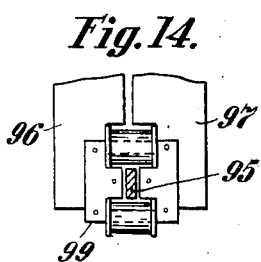

Patented Aug. 21, 1934

1,971,028

UNITED STATES PATENT OFFICE 1,971,028

ACOUSTIC ADVERTISING DEVICE

Otto Bothe, Berlin-Steglitz, Germany

Application September 17, 1928, Serial No. 306,542. Renewed July 14, 1934. In Germany September 17, 1927

5 Claims. (Cl. 179—100.2)

This invention relates to acoustic devices and aims to provide an apparatus for recording and automatically and repeatedly reproducing sound records, such as announcements and explanations. It is especially though not exclusively applicable for advertising purposes in stores, traffic centers, etc.

The apparatus is so arranged, according to this invention, that the continuously and automatically repeated sound matter can be altered without difficulty at any moment. With this object, the apparatus is provided with a combined recording and reproducing device, which not only effects the automatic recording of the sound matter—directed for example into a microphone—but also enables the matter to be changed at any time, without changing the recording or phonograph carrier. This possible changing of the sound matter or "text" (as hereinafter called) renders the apparatus particularly valuable, since it places one in a position to vary announcements at will, according to changing conditions or need. The favourable effect in advertising particularly is increased by the fact that continual change of text will hold the attention of the public.

In combination with a special shop-window reproducing device, the apparatus provides an extremely effective advertising medium, in that it may draw the attention of the passing throng by directing notice to articles on display, or making other announcements of general interest.

In this instance, the operation of the apparatus is entirely electrical and all that is required to start it is to connect it up to the lighting circuit. When the electric current is once switched on, the apparatus works quite automatically in all its parts, so that no attendance is needed except for talking or otherwise directing sound into the recording device for every change of text. The means employed in the construction of the apparatus are so chosen and arranged as to ensure not only the simplest possible manipulation, but also a certainty of operation, long period of service and multifarious applicabilities.

For special cases, the apparatus can be arranged for employment at will, for the direct reproduction of announcements. Moreover, for special purposes, such as combined pictorial and talking advertisements, the apparatus can be provided with special devices enabling it to be stopped automatically while the pictures are being changed.

When the apparatus is used for advertising in shop windows, the window pane itself may be utilized as the talking member. Apart from the advantage of clear and distinct transmission of speech, this arrangement also offers the advantage that the reproduction by means of the window glass is uniformly and clearly audible over the entire window front, the distribution of the sound waves being uniform in all directions, whilst the size of the oscillating surface ensures excellent tone reproduction.

An embodiment of the invention is illustrated for exemplification in the attached drawings, in which:—

Fig. 2 is a cross-section of the same on the line A—B of Fig. 1.

Figs. 3 to 5 respectively show separate details of the actuating and switch mechanism.

Fig. 6 represents the method of winding the speech record comprising a steel band.

Figs. 7 and 8 illustrate elevation and end views of the electromagnetic device for recording and reproducing the spoken text.

Fig. 9 represents a magnet device for recording speech in double column.

Figure 1:
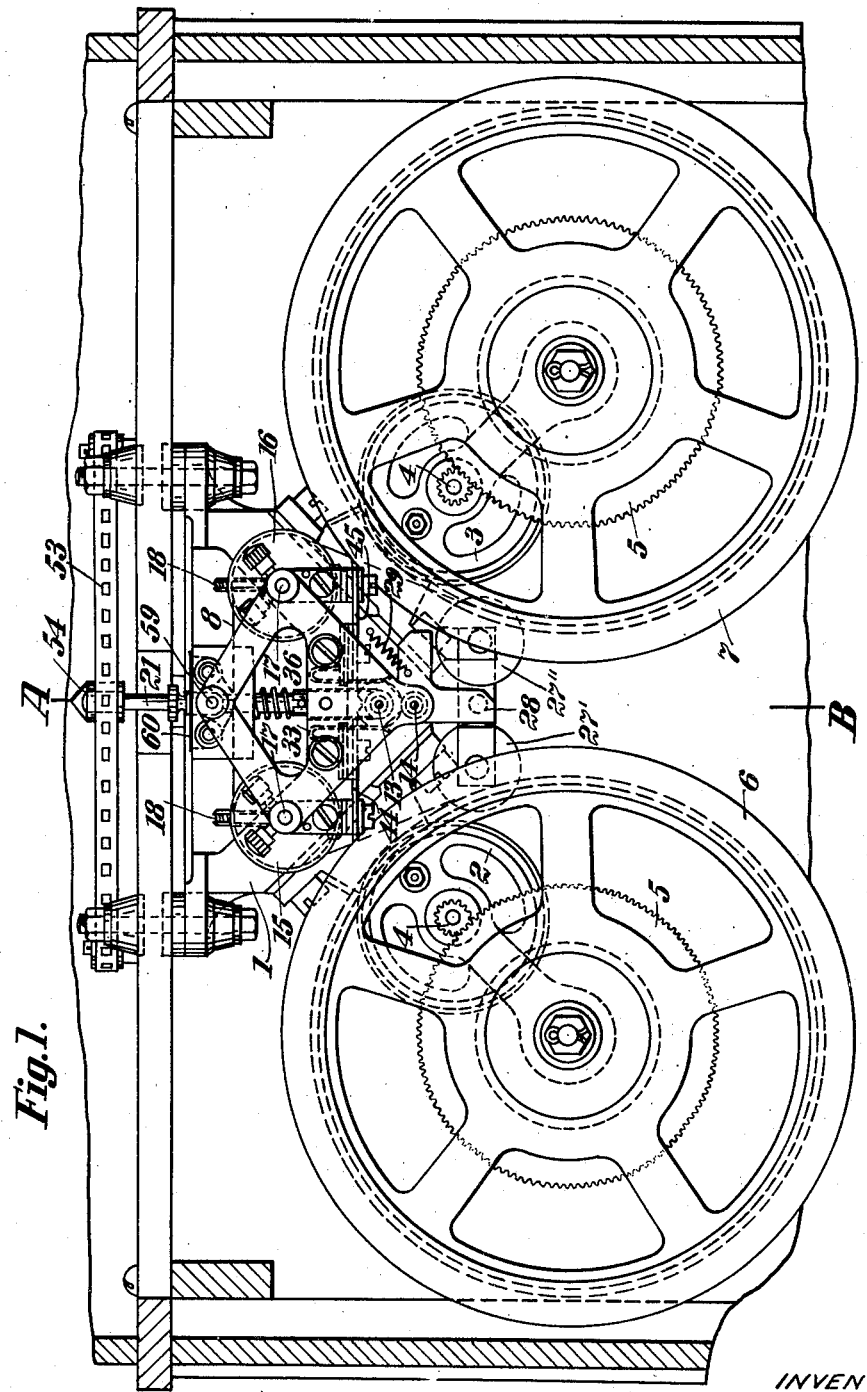
Fig. 1 represents an elevation of the actuating and switch mechanism of the apparatus partly in section.
Figure 10:
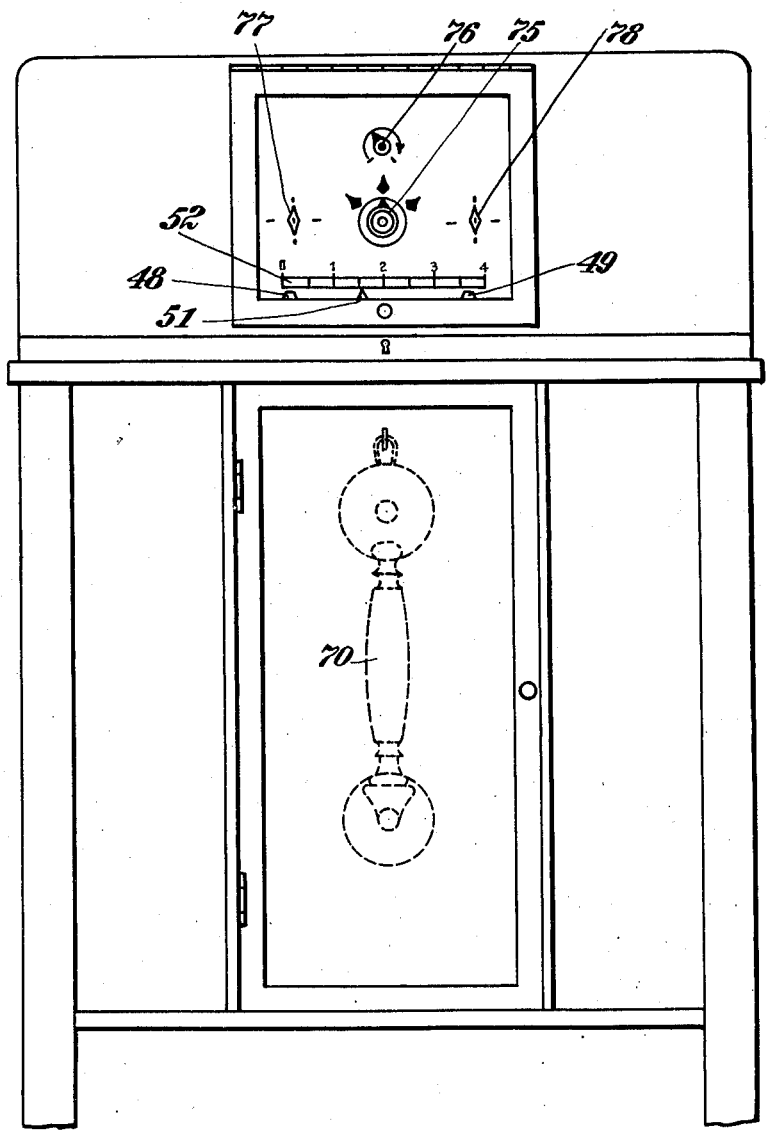

Fig. 10 represents the face of the case housing the apparatus, with switch-board.

Fig. 11 shows the circuit arrangements of the apparatus; and

Figs. 12 to 16 show different views of a device adapting the apparatus for shop-window advertising.

According to the invention, the means used for reeling and unreeling the sound reproduction or text records consist of electric machines, which are connected up, alternately, to act as driving motor and brake generator, and are automatically switched over prior to each reversal of the direction of travel of the record.

In this case the record carrier itself may serve to drive an electric motor which is running for the time being as a brake generator, this being a circumstance which enables a steel band to be used for carrying the record, which is highly advantageous for the purpose in view since it permanently assures the maintenance of this member in the tension required for satisfactory working.

As a further important advantage, this arrangement affords the possibility of allowing the reversal of the direction of movement to be effected—depending on the natural running-down of the machines—by means of a switch magnet energized by the brake generator current, the moment for the switching-over of the motors being variable at will in accordance with the length of the text to be reproduced for the time being.

A prismatic mount 1 carries on its sloping lower faces the two electric motors 2 and 3, the armature shafts of which are each connected, through pinion gears 4 and 5, with the drums 6 and 7. Wound upon these two drums is a narrow band 8 of spring steel, which carries the text record and is continually reeled from one drum to the other by one of the electric motors, the drum from which the steel band is for the time unreeling, being rotated by the pull transmitted by the band itself. Since the motor connected with the driven drum acts for the time as a generator, which is loaded by a loading resistance, the rotation of this drum is opposed with a braking effect thereby keeping the steel band in continuous uniform tension.

The resulting steady tensioning of the record carrier is important to the proper and reliable working of the apparatus, because the elastic force inherent in a steel band (or wire) and tending to loosen the superimposed coils, acts the more powerfully as the cross section of the record carrier increases. In the present apparatus, in which it is desirable to ensure not only a clear and intelligible, but also the loudest possible tone reproduction, it is of advantage to employ a record carrier which is both sufficiently long and of sufficient cross section to enable particularly powerful electromagnetic impulses to be produced in reproducing the recorded sound matter. In this case the use of a narrow steel band instead of a wire has the advantage that the magnetic cores which are actuated by the record, cannot gradually converge, as they tend to do in the case of a steel wire, owing to the wear resulting from the abrasive action, but maintain their distance permanently. Hence, no disturbing magnetic shunt connection can occur to weaken or spoil the magnetic impressions. Moreover, changes of position or twistings of the record carrier, such as would very readily occur in the case of wire with injurious effects, are precluded. Furthermore, a suitably chosen steel band behaves substantially better, in respect of elastic resistance, than a wire of the same cross-section.

The apparatus providing for the automatic switching-over of the motors connected to act alternately as motor and generator, is as follows:—

On the front side of the aforesaid mounting is a gear frame, (see Figs. 2 and 3) consisting of the pillars 9 and the gear plate 10, and in said mounting are journaled the two wheel shafts 11 and 12, the commutator shaft 13 and also the armature shaft 14. The steel band (about 1 mm. wide) wound on the two drums 6 and 7 passes over two guide rollers 15 and 16 mounted on said shafts 11 and 12. The resulting rotation of the last mentioned shafts is transmitted through worm gears 17 and 18 to a shaft 19 and through a worm gear on the latter intermeshing with gear 20 to a vertical shaft 21 (Fig. 2).

Said shaft 21 carries a pinion 23, which engages with a ratchet 22 (Fig. 2) and winds up the mainspring enclosed in a drum-casing 24 on the commutator shaft 13. The purpose of this mainspring is to turn said shaft 13 on intermittent release of a controlling armature escapement, consisting of the ratchet wheel 25 and pawl 26 (Figs. 4 and 5). This release is effected by means of an electromagnet $27^1$, $27^{11}$ having an armature 28 exerting torque against a spring 29 on said pawl each time the circuit of the electromagnet is completed. Consequently, every time the electromagnet $27^1$, $27^{11}$ actuates the armature 28, the escapement 25, 26 is released, and the commutator shaft is allowed to move, stepwise, into new positions.

The switching-over of the motors is effected by the aid of the commutator 30 which has sliding-contact springs 31 to 36 disposed on both sides adapted to establish conductive connection between the segments 37 to 42 of the commutator (Fig. 4a). For this purpose, the segments are alternately offset in such a way that, alternately, one of the two outer contact springs in both sides, is connected with the central contact springs in which current is constantly maintained. The arrangement is such that the set of springs situated on the one side switches-on one motor and the set of springs on the motor side switches-on the other. As will be seen from the circuit diagram (Fig. 11), the middle contact springs, both of the left-hand set corresponding to the motor, and of the right-hand set corresponding to the generator, are always connected, in a unipolar manner, to the current main or loading resistance, while—according to the relative position of the commutator segments—the outer contact springs alternately switch the armatures of the two motors 2 and 3 into connection with the line current, or short circuit by way of a loading resistance 43 (when the generator circuit is switched on).

The switch magnet for switching-over the two motors comprises two coils, mounted on a common iron yoke and each connecting with a pair of contact springs 44 and 45. These springs are controlled by two cam members 46 and 47, which are mounted on the shaft 13 and are set out of phase relative to one another, so that the two pairs of contact springs 44 and 45 are always alternately opened or closed. This arrangement switches the two coils of the magnet $27^1$, $27^{11}$, alternately, into parallel connection with the ballast resistance 43 of the generator circuit. However, the circuit for the magnet coil, switched-on for the time being, is not completed until one of two hand controlled sliders 48 and 49 is touched by a pointer 51 which travels along a guide rod 50. The pointer 51 follows the forward or return movement of the record carrier continuously to and fro, and in so doing indicates on a scale 52 (Fig. 10) the duration or termination of the sound reproduction or text. Its movement is effected positively by means of a perforated band 53, or the like engaging with pinion 54 and actuated by the shaft 21, being also passed over guide rollers at the corner points.

As the pointer 51 travels in one or the other direction, it encounters one or the other of said sliders 48 and 49, so as to temporarily complete the circuit of switch magnet. By the aid of these two sliders, the moment at which the electromotors are to be switched over for reversing the direction of movement of the record carrier in accord with the length of the text to be repeated for the time being, can be adjusted at will. Moreover, individual portions of the text can be repeated separately on occasion by suitably adjusting the two limiting sliders.

Each time the aforesaid armature escapement is released, the commutator 30 passes into its next switching position only after the return of the armature. Consequently, the switching-over of the motors takes place in two successive stages, so that the switching-off and switching-on actions of the motors are separated by an intermediate position of the commutator. In combination with the described switching method according to which the switch magnet is energized by the generator current, this arrangement has the advantage that the switching-over depends on the natural running-down of the motors, since the release of the armature takes place only with the gradual disappearance of the generator current as the motors are started up. In this way, the disturbing influence of mass inertia, and at the same time the occurrence of an injurious interruption sparking at the moment of switching over, are prevented.

The necessity of accommodating a relatively long record band calls for the provision of a device by means of which the band may be coiled in layers on the drums 6 and 7, which are formed with ample coiling space.

Such a device may consist of a partially toothed pinion 55 mounted on the vertical shaft 21 and intermeshing alternately with the racks 57 and 58 (see Fig. 3) arranged on either side of the shaft in a yoke 56, which accordingly moves uniformly to and fro as the pinion rotates. The yoke rod 59 carries a magnet unit 60 which effects the recording and reproduction of the sound or text to be repeated, the carrier of said unit being provided with a longitudinal groove in which the record band is guided transversely in relation to its course. The ratio of transmission of the worm gear actuating the shaft 21 is preferably such that said magnet carrier 60 guiding the record band slides a distance equal to half the width of the band for each revolution of the drum. This effects a systematic winding and unwinding of the band and at the same time causes the successive coils thereof to overlap as represented in Fig. 6. This method of reeling has the further advantage of preventing injurious interference between the magnetically fixed records on the steel record band, since the coils lying in direct superimposition are offset, in each case, by half the width of the band.

The device for recording the sound oscillations consists of an electromagnet which is energized by a microphone. The electromagnetic method of recording employed is known per se, and is based on the transverse magnetization of a hardened steel band or steel wire in accordance with the sound oscillations. This method of recording is particularly suitable for the present purpose, because an electromagnetic phonographic record cannot be worn down like a wax cylinder or the like, by the continued repetition of the sound matter. Magnetic recording also affords the advantage that it can be expunged at any time, in order to renew the matter to be reproduced, this being effected by means of the same electromagnet. In order to enable the receiving microphone 70 (through which sound to be reproduced is directed into the recording device), to be used direct for talking into the transmitter when desired (and thereupon disconnecting the recording apparatus), all that is necessary is to provide a hand controlled reversing switch 75 (Figs. 10 and 11) with a corresponding switching stage.

The electromagnet serving for recording and reproduction, or expunging the spoken text, consists of two coils 61 and 62 (Figs. 7 and 8), the iron cores 63 and 64 of which respectively form the two outer arms of a three-armed iron yoke, whose central arm members 65 and 66 bear (by means of their poles 67 and 68), like a saddle on the record band 8. The band is guided by means of a longitudinal groove 69 in the magnet carrier past the poles of the electromagnet in such a way as to be continuously permeated by the magnetic flux, transversely in relation to its longitudinal direction.

In consequence of this band being magnetized transversely in relation to its longitudinal direction, specially powerful magnetic effects are produced, because the distance between the poles—which is determined by the width of the band—is in a particularly favourable relation to the thickness of the band, so that the demagnetization factor dependent thereon, remains relatively low. The favourable effect of this disposition of the poles is further supported by the overlapping arrangement of the band coils when reeled on the drum, so that the pole positions lie over the magnetically neutral zone of said band.

By employing a correspondingly wider band, it is also possible to arrange two magnet units, the poles of which are relatively offset as represented in Fig. 9. This arrangement enables two-column records to be made, with the additional advantage that the band can be utilized, in its return travel, for recording and reproducing speech. In this manner a considerably shorter record band will suffice, and the pauses can be either omitted entirely, or introduced into the text at will.

To prevent possible interference between the adjacent double-column records, the magnetic impressions are fixed with a polarity which alternates from column to column, for which purpose the two electromagnets (one of which comes into action during the forward travel of the steel band and the other during its return) are switched over in such a way as to be traversed by the microphone current in opposite directions. If—as is also feasible—more than two columns of speech impressions are to be recorded on the steel band, it is advisable to employ an even number of columns, so as to be able to pass directly from the end of the last column to the beginning of the first one. With a multi-column record of the spoken text the corresponding wide steel band is preferably reeled on drums of the same width as the band, and only a single magnet unit need be employed, this being shifted progressively from one column to the other after each forward and return movement of the band.

The entire electrical arrangement of the apparatus is represented in the circuit diagram of Fig. 11. In order to obtain the most powerful magnetic impressions possible on the record band, the recording device is disposed, not directly on the microphone, but on an amplifier which amplifies the microphone current. This amplifier comprises two amplifying valves 71 and 72, acting in opposition, the input transformer 73 of which has its primary situated in the microphone circuit. The anode current of the two valves flows (in the manner indicated in the circuit diagram) through the two coils 61 and 62 of the recording magnet, which is thereby varyingly magnetized in accordance with the fluctuations in the microphone current. Since the flux of the electromagnet is thereby continuously closed by the record band moving under its poles, said band is also continuously magnetized in accordance with the fluctuations in the microphone current, the magnetic effects being retained in consequence of the magnetic permanence of the steel record band.

The reproduction of the spoken text recorded in this manner is effected by switching over the electromagnets 61, 62 onto the input transformer 74 of the reproduction amplifier which, as shown by the circuit diagram, is designed as a two-stage opposed power amplifier. The expunging of the old record before making a new record on the record band is effected, in a simple manner, by correspondingly switching-over the electromagnets onto the amplifier 71 and 72 and furnishing, in this case, a perfectly constant current, which progressively destroys the existing impressions on the steel band during the passage of the latter, by an opposite magnetization of equal intensity to that existing.

To switch the apparatus over for the various operations of (a) recording, (b) reproducing, and (c) expunging, the common change-over switch 75 (Fig. 10) is employed, which is shown mounted on a switch-board behind a hinged glass window. As can be seen, this switch-board carries the already described progression pointer and scale (51 and 52), and a control resistance 76, which is connected in parallel with the input transformer 74 of the reproduction amplifier, and serves to regulate the tone strength of the reproduction. Switches 77 and 78 serve respectively for switching the motor and reproduction device on and off.

The microphone battery 79 is automatically switched on and off as the microphone 70 is removed from and returned to its hook-switch 80, by means of which the telephone combined with the microphone is also automatically switched on and off. By means of this telephone (with the switch set for "repeat") it is possible to listen in advance to the spoken text each time a fresh record has been made on the steel band.

The working current for the amplifiers is drawn from the lighting circuit in a known manner. The circuit diagram of Fig. 11 represents suitable circuit arrangements for alternating current, which is the chief type of current in use.

A transformer 81, the primary winding of which is connected to the lighting circuit, is provided with a plurality of secondary windings, of which the winding I serves to heat the valve rectifier 82; the winding II heats the amplifying valves 71, 72 and 85—86; whilst the winding III furnishes the anode current to be rectified. The winding III has a central tapping, from which a wire leads to the positive pole of the heating filament of the rectifier, while the two ends of the said winding are connected to the two anodes of the rectifier valve 82. The direct current furnished by the rectifier is passed through choke coils 87 and 88 (with condensers in parallel) in order to smooth out any pulsations. By means of a high resistance 89, serving as a voltage distributor, the requisite anode voltage is supplied to each pair of valves of the amplifier device. In order to eliminate the line disturbances which occur when the amplifier valves are directly heated with alternating current, so-called alternating current valves with indirectly heated cathodes are provided.

In order to enable a uniform type of machine to be used for direct and alternating current, an A. C. series motor (universal motor) is employed. Whenever the motor is to run as a generator, an auxiliary winding 90 is switched into the circuit of the rectifier 80 and effects the polarization of the magnets in the manner necessary for working as a generator. A valve rectifier can also be replaced by a metallic-oxide rectifier (e. g., a dry rectifier or coherer), which can be connected up as a full-wave rectifier, the same as a valve rectifier.

Figs. 12 to 16 show a special embodiment of the reproduction device or speaker 93 to be connected up in the secondary circuit of the output transformer 92 of the reproduction amplifier. Said device may be attached in any convenient manner, and in any desired position, as for example in the wall or inside a doll or the like. For shop-window advertising it is preferably connected with the window glass which acts as the diaphragm. For this purpose, use is made of a magnet unit 94, operating on the relay principle, the armature 95 of which is polarized by the permanent ring magnets 96 and 97. The speech current flows through the coils of the two electromagnets 98 and 99, between the poles of which oscillates the armature 95 carried by the flat springs 101 and 102. A rod 100 attached to this armature bears with a certain pressure against the window glass and thus transmits the oscillations of the armature thereto. The pressure with which the rod 100 bears against the glass can be adjusted to the degree most favourable for the reproduction, by means of an adjusting screw 104 acting on the spring 103.

To facilitate attachment to the window glass, the magnet unit is preferably mounted on a lever mechanism, preferably consisting of a fulcrumed lever 105, which is supported against the window glass in such a way that the counter-pressure necessary for pressing the magnet unit against the glass is absorbed by the lever mechanism itself. Consequently, this mechanism is so arranged that both its lower point of support 106 and its points of application 107 and 108—the lower one of which (108) also actuates the glass—bear against the glass. The fulcrum 106 is attached to the glass by a suitable vacuum cup 109. The lever mechanism is relieved of its own weight and that of the magnet unit, by a wire or like suspension 110, which is fastened above the window, for example on the window frame.

This method of mounting enables the talking device to be attached at any convenient height on the window; and the arrangement is adaptable to any show window, being entirely independent of the type and dimensions of the latter. Owing to its decorative and inconspicuous design, it can be embodied in any decoration without affecting the external aspect of the window.

I claim:—

1. In an electrical acoustic device for advertising and selling purposes for reproducing sales- and propaganda-talks, automatic means for incessant repetition of talks recorded on a record-carrier the means for reproducing same consisting in a magnetic system and a shop-window-pane utilized as a vibrating diaphragm.

2. In an electrical acoustic device for advertising and selling purposes for reproducing sales- and propaganda-talks, automatic means for incessant repetition of talks recorded on a record-carrier, the means for reproducing same consisting in magnetic system and a shop-window-pane utilized as a vibrating diaphragm, including two electro-motors for the drive of said record-carrier; means for cutting into circuit said motors alternately as driving motor or driven brake-dynamo; including a constant load resistance each time cut into circuit with the brake dynamo; means for automatically switching over said circuits after each turn; and means for transmitting the recorded text into electrical sound currents.

3. In an electrical acoustic device for advertising and selling purposes for reproducing sales- and propaganda-talks, automatic means for incessant repetition of talks recorded on a record-carrier, the means for reproducing same consisting of a magnetic system and a shop-window-pane utilized as a vibrating diaphragm, including two electro-machines for the drive of said record-carrier; means for cutting into circuit said machines alternately as driving motor or driven brake-dynamo; including a constant load-resistance each time cut into circuit with the brake-dynamo; means for automatically switching over said circuits after each turn comprising a friction clutch, a spiral spring wound up in course by said friction clutch, an electrical-magnet shunted to the load-resistance, a contact arrangement under control of the travel of said record-carrier and an armature-locking-device set free eventually by the electromagnet; and means for transmitting the recorded text into electrical sound currents.

4. In an electrical acoustic device for advertising and selling purposes for reproducing sales- and propaganda-talks, automatic means for incessant repetition of talks recorded on a record-carrier, the means for reproducing same consisting of a magnetic system and a shop-window-pane utilized as a vibrating diaphragm; a microphone for recording and an amplifier for reproducing and means for switching over both to record and to reproduce and also to the shop-window-pane reproducing system to make utterance of direct exclamation possible.

5. In an electrical acoustic device for advertising and selling purposes for reproducing sales- and propaganda-talks, automatic means for incessant repetition of talks recorded on a record-carrier consisting of one single, thin but wide, steel-film and means for magnetic recording in two parallel lines, running forward and backward, means for reproducing said recorded talks consisting of a magnetic system and a shop-window-pane utilized as a vibrating diaphragm.

OTTO BOTHE.